3,644,394
Patented Feb. 22, 1972

3,644,394
CONDENSATION PRODUCTS OF N-COUMARIN ALKYLPYRAZOLES AND ALDEHYDES
John Albert Gurney, Tarrytown, N.Y., assignor to Ciba-Geigy Corporation, Ardsley, N.Y.
No Drawing. Filed June 24, 1968, Ser. No. 739,139
Int. Cl. C07d 49/18
U.S. Cl. 260—310 R     6 Claims

ABSTRACT OF THE DISCLOSURE

Brightening compounds are incorporated as mass brighteners of synthetic polyester and polyacrylonitrile materials to produce a highly fluorescent product characterized by a high degree of retentivity and stability without affecting the desirable properties of the aforesaid synthetic materials. A species of the color brightening compounds is bis [1 - (3-phenylcoumarin-7-yl)-3-methylpyrazol-4-yl]methane.

The present invention relates to new and improved optical brighteners, and more particularly to the mass optical brightening of synthetic polyesters and polyacrylonitrile.

While polyester fibers (films and shaped articles) and especially polyesters of terephthalic acid identified as "Dacron" and "Terylene" such as, for example, poly-(ethylene terephthalate) as well as related copolyesters and synthetic polyacrylonitrile have attained significant commercial acceptance, one deficiency has been noted and that is the inherent yellowish or greenish-yellow off-white appearance of the aforesaid polyester or polyacrylonitrile products. This undesirable coloration becomes more pronounced as time goes on and this condition is only partially improved by bleaching. The yellowish color is quite noticeable also even when the materials are dyed or colored and the diminished brightness becomes more pronounced as the polyester product ages.

In an attempt to avoid the undesirable coloration mentioned above, fluorescent compounds have been added to polyesters and polyacrylonitrile to produce a whiter and/or brighter material. However, such compounds referred to as "optical whiteners" or "optical brighteners" are usually effective when the polyesters or polyacrylonitrile containing the optical brighteners are viewed in daylight or artificial light. Generally, the prior art optical brighteners have been found to be lacking in intensity which may be due to the optical properties of the brightener, retentiveness of the brightener in the substrate, the stability of the processing conditions or stability under usage conditions.

Further, the homogeneous mass brightening of the synthetic polyesters or polyacrylonitrile with optically brightening compounds presents some problems as compared with the procedures used in the brightening of substrates by milder procedures as, for example, treatment baths, i.e., the Thermosol process. In the Thermosol process, the procedures are less stringent as regards the temperatures used, effect on chemical stability and required retentiveness of the brightener and subsequent stability during usage. In addition, in the Thermosol process, the optically brightening compound may lie actually only on the surface of the substrate. The optically brightening compound may be introduced to the interior of the substrate by the more difficult polymerization process (mass brightening). Still further, if the optically brightening compound or a substrate becomes inactive, it can generally be removed but only partially replaced by fresh treatment with fresh brightener. On the other hand, using the mass polymerization procedure, there is greater difficulty in attempting to brighten synthetic polyesters or polyacrylonitrile homogeneously to obtain a satisfactory and sufficiently lasting effect. If the optically brightening compound is included with the monomeric polymerizable initial material or monomers (a preferred embodiment of the present invention), the optically brightening compound is subjected to substantially severe reaction conditions while simultaneously being exposed to the influence of reactive chemical compounds. Thus, the homogeneous incorporation of optically brightening compounds into the synthetic polyesters or polyacrylonitrile exposes the optically brightening compounds to far greater stress than is the case involving the conventional application of the brightening compounds to substrates. In view of the exposure of the optically brightening compounds to vigorous reaction conditions and reactive chemical reagents, the brightening compounds are generally damaged and/or partially or completely decomposed. The injurious influence may also become evident by the fact that the optically brightening compound may be converted into inactive compounds which not only do not impart any brightening to the polyester or polyacrylamide material but even make such polyester material unattractive. Obviously, the removal of such undesirable substances from the finished material or a fresh treatment for homogeneous brightening is not possible.

One object of the present invention is to provide new compounds which are especially well suited to the optical brightening of synthetic polyesters or polyacrylonitriles because they provide a very durable brightening effect and are very stable. Another object of the present invention is to provide novel synthetic polyester or polyacrylonitrile materials which overcome the aforesaid disadvantages of prior art compositions. A further object of the present invention is to provide novel homogeneous and very stable polyester or polyacrylonitrile products possessing increased brightness without in any way adversely affecting the desirable properties of the aforesaid polyester or polyacrylonitrile materials. Other objects will be apparent from the description and claims which follow and these and other objects are accomplished by means of this invention as described more fully hereinafter with particular reference to certain preferred embodiments thereof.

It has now been found surprisingly that an unusually bright and white appearance together with the advantageous properties referred to above are exhibited by polyester or polyacrylonitrile materials and particularly fibers of synthetic condensation polyesters or polyacrylonitrile having homogeneously incorporated therein a brightening amount of at least one aldehyde dimer of a 1 - (3-phenylcoumarin-7-yl)-3-alkylpyrazol represented by the formula:

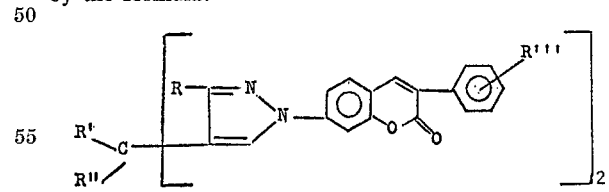

wherein

R is lower alkyl; R' is H, alkyl, phenyl, naphthyl or substituted phenyl of the formula $C_6H_{5-n}X_n$ when $n$ is 1 or 2 and X is H, lower alkyl, alkoxy or chloro; R" is H and R'" is H or lower alkyl.

One important aldehyde dimer of 1-(3-phenylcoumarin-7-yl)-3-methylpyrazol is bis[1-(3-phenylcoumarin-7-yl)-3-methylpyrazol-4-yl]methane represented by the formula

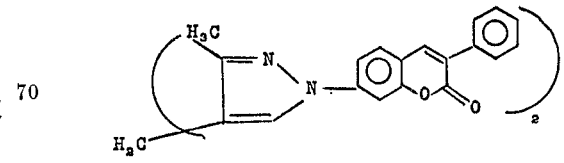

The expression "lower alkyl" as used herein is intended to cover alkyl groups containing from 1 to 6 carbon atoms such as methyl, ethyl, propyl, butyl, sec.-butyl, pentyl, isopentyl, hexyl, and the like; "alkoxy" is intended to cover alkoxy groups containing from 1 to 4 carbon atoms such as methoxy, ethoxy, propoxy and butoxy and "alkyl" is intended to cover alkyl groups containing from 1 to 18 carbon atoms, straight or branched and includes for example, methyl, ethyl, propyl, isopropyl, butyl, isobutyl, tertiary-butyl, isoamyl, n-hexyl, n-octyl, n-nonyl, n-dodecyl, n-octadecyl, and the like.

The aforementioned novel optical brighteners are obtained by dimerizing the corresponding starting materials which are brightener moieties with a suitable aldehyde in the presence of a catalyst. In a typical reaction, 1-(3-phenylcoumarin-7-yl)-3-methylpyrazole is reacted with trioxane to obtain bis[1-(3-phenylcoumarin-7-yl)-3-methylpyrazol-4-yl]methane. This reaction is represented by the following equation:

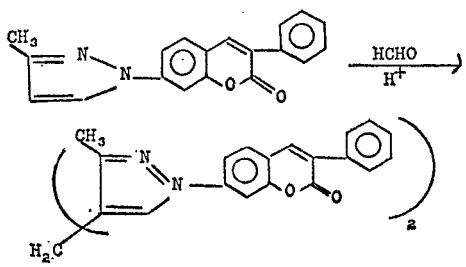

The reaction used in preparing the desired optical brightener products is preferably conducted in the presence of an acid catalyst such as hydrochloric acid, sulfuric acid, phosphoric acid, acetic acid, trifluoroacetic acid, p-toluene sulfonic acid, or the like. The catalyst used is in a 1:10 molar ratio with respect to the starting aldehyde and in a 1:20 ratio with respect to the pyrazole compound. It is desirable to avoid, in the reaction, an excess of aldehyde as otherwise, an undesirable oligomeric material is obtained. Therefore, an excess amount of pyrazole to aldehyde reactant should be used and it is therefore preferred to use the aforesaid reactants in a 2:1 pyrazole to aldehyde molar ratios. It should also be mentioned that the dimerization reaction is generally conducted in a solvent medium which may be preferably either an acid medium, i.e., acetic acid, or an aqueous medium such as an aqueous-hydrochloric acid-ethanol medium (1:1 ratio). The solvent is used in a ratio of 2:3 weight to volume. The reaction is preferably conducted at an elevated temperature that is, at about reflux temperature and ranges between about 120° to 215° C., depending upon the solvent used in the reaction.

Suitable aldehydes used in preparing the optical brighteners of the present invention are represented by the formulae (1)      OCH—R—CHO wherein R represents $(CH_2)_n$ and $n$ is an integer from 0 to 12 or arylene.

(2)
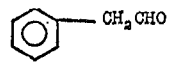

and (3)      R''''CHO wherein

R'''' represents $CH_3(CH_2)_n$ and $n$ is an integer from 0 to 17.

Specific aldehydes which can be used include, for example, formalin, trioxane, acetaldehyde, glyoxal, benzaldehyde, octadecylaldehyde, paraldehyde, terephthaldehyde, and the like.

The homogeneously optically brightened synthetic polyester or polyacrylonitrile product is obtained by adding at least one optical brightener of the present invention to the mixture containing the monomers or monomeric polymerizable initial material.

The amount of the optical brightener to be used according to the invention (expressed in terms of percentage of the weight of the synthetic polyester or polyacrylamide material to be brightened), varies within wide limits. Even a very small amount such as 0.001% will produce a distinct and durable effect. Generally, while an amount of more than 3% of the color brightener is not harmful, it does not provide any advantages over quantities normally used or preferred which may range up to 0.03%.

The optical brightening compounds of the present invention are extremely stable even at the temperatures used in polymerization and fabrication. They do not crystallize out in the synthetic polyester polyacrylonitrile product and cannot be easily dissolved out from them. The optical brightening effect is stable to washing, heat, light, dry-cleaning, bleaches, sublimation, etc. The fastness of light is very good and even exposure of the polyester or polyacrylonitrile products to sunlight does not alter their brightness. The brightener compounds are so firmly embedded in the polyester or polyacrylonitrile products that it seems they are chemically combined therewith. It has been found that the brightener compound does not diffuse from the synthetic polyester or polyacrylonitrile material but is physically combined with and tenaciously held by the aforesaid synthetic material.

The optical brightener materials of the present invention can be included, for example, in the polymerization of ethylene glycol and dimethyl terephthalate to provide mass brightened polyester. These materials are included in the range of 0.001% to 0.1% by weight. The fluorescence of the optical brightener compounds provides an increase in whiteness of the polyesters thereby increasing their attractiveness and value.

The retentiveness of the synthetic materials mentioned is valuable during the polymerization or manufacture, fabrication and use of polyester. One reason is that the polymerization evolves ethylene glycol as a reaction product and tends to carry less retentive brighteners from the polymer during manufacture. The optical brightening compounds of this invention are, on the other hand, very retentive and the ethylene glycol does not have the aforesaid effect on the present optical brightening compounds.

Further, the brightener molecule is stable during the polymerization and during the polymer processing (this is called chemical stability) to provide a fully brightened product after polymerization and fabrication.

Finally, the properties of the polyester are not detracted from but are rather imrpoved by the presence of the brightener. For example the molecular weight, glass transition and melting points of polyethylene terephthalate remain the same as the corresponding values of control polymers.

The invention is illustrated by the following examples which are included for purposes of illustration only and are not intended to limit the scope of the invention. In all instances, the temperature is in ° C., unless otherwise indicated.

EXAMPLE 1

Bis[1-(3-phenylcoumarin-7-yl)-3-methyl-pyrazol-4-yl]methane

An acetic acid solution of trioxane (4.99 g., $1.66 \times 10^{-1}$ mol in 125 ml.) was added at a constant rate (21 ml./hr.) over six hours to a hydrogen chloride-acetic acid solution of 1-(3-phenylcoumarin-7-yl)-3-methylpyrazol (100 g., $3.32 \times 10^{-1}$ mol in 1.275 l.). A rapid stream of hydrogen chloride for 0.5 hr. provided saturation of the acetic acid and reflux for an additional 30 hrs. completed the reaction.

The filtered product (mixture cooled to 18°) was washed thoroughly with methanol (100 ml.), filtered and dried 3 hrs. at 120°/0.2 mm.; crude yield—96.9 g., 95% of theory. After recrystallization (0°) from o-dichlorobenzene (1.5 l.), washing with a minimum of methylene chloride and drying three hours at 120°/0.2 mm., the desired product was obtained in the form of light yellow flakes; M.P. 302–3°, yield 94.2 g., (92.4% of theory).

NMR Spectrum

Tabulation of signals in $CF_3COOD$ solvent

NMR SPECTRUM

[Tabulation of signals in $CF_3COOD$ solvent]

| α, p.p.m. | Integration | Multiplicity | Assignment |
|---|---|---|---|
| 2.73 | 6.3 | Singlet | Methyl. |
| 4.17 | 2.2 | do | Methylene. |
| 7.4–8.1 | | Multiplet | Aromatic. |
| 8.13 | 19.5 | Singlet | Vinyl (alpha to phenyl). |
| 8.49 | | do | Vinyl (alpha to N). |

The above spectrum is compatible with the indicated structure of the product.

The optical brightener product obtained above was incorporated in poly(ethylene)terephthalate and accompanying additives using the following procedures:

(a) Poly(ethylene terephthalate), high molecular weight.—The optical brighter in separate amounts of 0.062, 0.031, 0.016 and 0.0078 g.; (0.1, 0.05, 0.025, 0.01% by wt. respectively in the final polymer), calcium acetate monohydrate (0.092 g., $5.2 \times 10^{-4}$ mol), dimethyl terephthalate (62.0 g., 0.320 mol) and ethylene glycol (47.2 g., 0.762 mol) were placed with the aid of a long powder funnel into a specially modified polymer tube. The polymerization tube (25 cm. x 3.5 cm. O.D.) had been fitted with a side-arm at the entry port (10 mm. O.D.) and with a cone-shaped (10 mm. O.D. at the base, ca. 3 cm. long) extrusion port at the bottom. The tube was flushed 20 to 25 mins. (and maintained thereafter) with an atmosphere of nitrogen (<5 p.p.m. oxygen). The mixture melted smoothly when it was partially immersed (25 mins.) in an ethylene glycol vapor bath (197° C.). The liquid reaction mixture was then stirred with bubbling nitrogen throughout transesterification and, later, during the polymerization period.

The completely immersed reaction mixture evolved 26 mls. of methanol during 3 hours of transesterification. The transesterification was completed by transferring the tube and contents to a methyl salicylate vapor bath (222° C.) for 20 minutes. At the end of this time antimony trioxide (0.024 g., $8.2 \times 10^{-5}$ mol) and a 5% titanium dioxide (Cyanamid Unitane 0–110) suspension (mixed 15 mins., vibromixer) in ethylene glycol (4.0 ml., 0.03% of $TiO_2$ in the final polymer) were added under a nitrogen blanket to the pre-polymer mixtures described supra.

Polymerization for three hours in a dimethyl phthalate vapor bath (283° C.) under a nitrogen atmosphere of 0.3 to 0.1 mm. pressure gave 24 ml. of ethylene glycol and white semi-dull poly(ethylene terephthalate) polymers, having inherent viscosities of 0.5 to 0.6. When the polymerization was completed, the polyester was extruded with 12 lbs. of nitrogen pressure through the extrusion port to a beaker of cold water, thus providing glass-free, amorphous polymer of excellent brightness.

(b) Poly(ethylene terephthalate), low molecular weight.—Bis(2-hydroxyethyl)terephthalate (39.7 g., 0.156 mol) which was under nitrogen (<5 p.p.m. $O_2$, 20 min. preflush) was melted (ca. 15 mins. at 222°) in a polymer tube fitted with a side-arm at the entry port and saturated (10 mins.) with nitrogen in the melt. An ethylene glycol suspension of antimony peroxide (2.0 ml., $4.00 \times 10^{-3}$ g./ml., $2.47 \times 10^{-5}$ mol) was added with a syringe and Teflon needle to the nitrogen-saturated melt just mentioned.

Five minutes later, an ethylene glycol solution of triphenyl phosphite (3 ml., 2% by wt.) was added in the same way. Five minutes after the second addition an ethylene glycol (2.00 ml.) suspension of titanium dioxide (5.0% by wt.) and antimony trioxide ($4.00 \times 10^{-3}$ g./ml., $2.70 \times 10^{-3}$ mol) was added. Then the polymerization tube contents were placed in a dimethyl phthalate vapor bath 283°) for an hour.

Ethylene glycol (8.7 ml.) was distilled from the polymerization under a nitrogen atmosphere (0.3 mm.) during the hour. Finally, cooling provided a glass-free, crystalline white plug of low MW polyester, intrinsic viscosity (0.50% by wt. in 1:1 phenol/tetrachlorethane at 30°) of 0.2.

EXAMPLE 2 n-Heptyldecyl-bis-[1-(3-phenylcoumarin-7-yl)-3-methyl-pyrazol-4-yl]methane

The trimer of octadecylaldehyde (4.43 g., $1.66 \times 10^{-3}$ mol), 1-(3-phenylcoumarin-7-yl)-3-methylpyrazole (10.0 g., $3.31 \times 10^{-2}$ mol), p-toluenesulfonic acid monohydrate 85% (0.324 g., $1.66 \times 10^{-3}$ mol) and 1,2,4-trichlorobenzene (15 ml.) were refluxed under nitrogen for 24 hours.

Unreacted starting material precipitated on cooling to room temperature. The product was recovered by evaporating to dryness, subliming from the mixture additional starting material and then chromatographing the crude product. A chloroform solution of the resulting solid was placed on a silica gel column and eluted with a mixture of benzene, chlorofrom and ethyl acetate (40, 40 and 20%). The dried product was recrystallized twice from benzene and after drying for 24 hours at 120°/0.05 mm., the desired product was obtained as a very light yellow powder, M.P. 187–8.5°.

EXAMPLE 3

Methyl-bis-[1-(3-phenylcoumarin-7-yl)-3-methylpyrazol-4-yl]methane

Paraldehyde (0.731 g., $1.66 \times 10^{-2}$ mol), 1-(3-phenylcoumarin-7-yl)-3-methylpyrazole (10.0 g., $3.31 \times 10^{-2}$ mol), p-toluenesulfonic acid monohydradte 85% (0.324 g., $1.65 \times 10^{-3}$ mol) and 1,2,4-trichlorobenzene (15 ml.) were frozen in an isopropanol-Dry Ice bath and outgassed at 0.05 mm. The sealed and evacuated system was then refluxed for 24 hours.

The reaction mixture on cooling to room temperature precipitated unreacted starting material. The product was recovered by evaporating the filtrate, recrystallizing twice from dimethylformamide and once from chlorobenzene and then drying overnight at 120°/0.02 mm. (M.P. 280.5–282° C.).

EXAMPLE 4

Phenyl-bis-[1-(3-phenylcoumarin-7-yl)-3-methylpyrazol-4-yl]methane

Benzaldehyde (1.93 g., $1.66 \times 10^{-2}$ mol), 1-(3-phenylcoumarin-7-yl)-3-methylpyrazol (10.0 g., $3.31 \times 10^{-2}$ mol), toluenesulfonic acid monohydrate 85% (0.324 g., $1.66 \times 10^{-3}$ mol) and o-dichlorobenzene (15 ml.) were refluxed 22 hours to give 75% conversion.

Chiefly starting material precipitated on cooling (25°). The product was recovered by adding hexane to the filtrate, washing the precipitate with methanol and two slow (18 hrs.) recrystallizations from chloroform.

The light yellow slightly fibrous solid was dried overnight at 120°/0.02 mm. (275–7°).

EXAMPLE 5

4-biphenyl-bis-[1-(3-phenylcoumarin-7yl)-3-methyl-pyrazol-4-yl]methane

A mixture of 4-biphenylcarboxyaldehyde (3.02 g., $1.66 \times 10^{-2}$ mol), 1-(3-phenylcoumarin-7-yl)-3-methylpyrazole (10.0 g., $3.31 \times 10^{-2}$ mol), p-toluenesulfonic acid monohydrate 85%. (0.324 g., $1.65 \times 10^{-3}$ mol) and 1,2,4-

ANALYTICAL DATA—PRODUCTS OF EXAMPLES 1-7

| Examples | M.P., °C. | Elemental Analysis, percent | | | | | | NMR, p.p.m. | | U.V. λmax., mμ | Ma | M.W. | IR, cm.⁻¹, tert. C-H | Whiteness[1] values at 250 p.p.m. |
|---|---|---|---|---|---|---|---|---|---|---|---|---|---|---|
| | | Calculated | | | Found | | | | | | | | | |
| | | C | H | N | C | H | N | Tert. C-H | CH₃ | | | | | |
| 1 | 302-3 | 75.95 | 4.58 | 9.08 | 75.84 | 4.50 | 8.98 | 2.73 | 4.17 | 357 | 79,050 | 616.63 | 2,840 | 123 |
| 2 | 187-8.5 | 78.65 | 7.31 | 6.55 | 78.61 | 7.51 | 6.81 | 2.70 | 4.30 | 358 | 73,400 | 852.63 | 2,845 | 103 |
| 3 | 280-2 | 76.17 | 4.80 | 8.88 | 73.42 | 4.50 | 8.83 | 2.69 | 4.50 | 357 | 70,000 | 630.67 | 2,870 | 121 |
| 4 | 275-7 | 78.02 | 4.67 | 8.11 | 77.79 | 4.59 | 8.14 | 2.58 | 5.73 | 356.5 | 73,500 | 692.74 | 2,850 | 123 |
| 5 | 280-3 | 79.67 | 4.72 | 7.29 | 79.41 | 4.55 | 7.30 | 2.61 | 5.75 | 356 | 74,450 | 770.85 | 2,865 | [2]133 |
| 6 | 350-2 | 77.16 | 4.47 | 8.57 | 76.35 | 4.44 | 8.64 | 2.58 | 5.82 | 355 | 131,000 | 1,307.7 | 2,853 | [2]109 |
| 7 | 280-3 | 79.67 | 4.72 | 7.29 | 79.41 | 4.55 | 7.30 | 2.58 | 5.89 | 356 | 66,200 | 742.79 | 2,860 | 116 |

[1] P. S. Stensby, Soap & Chem. Specialties, 53 (7), page 86 (July 1967).
[2] Extrapolated values.

trichlorobenzene (15 ml.) reacted during 24 hours to give on cooling (25°) a red solid.

The crude precipitate was dissolved in hot chlorobenzene, treated with Darko KB and recrystallized. A chloroform solution of the semi-pure product was placed on a silica gel column and the product eluted with 5% ethyl acetate in chloroform. A further recrystallization from chlorobenzene and drying 24 hrs. at 120°/0.05 mm. gave the desired product as a light yellow solid, M.P. 280–283°.

EXAMPLE 6

1,4-xylylidene-4,4′,4″,4‴-tetrakis[1-(3-phenylcoumarin-7-yl)-3-methylpyrazol]

Reflux of terephthaldehyde (1.11 g., 8.32×10⁻³ mol), 1-(3-phenylcoumarin-7 - yl) - 3 - methylpyrazole 10.0 g., 3.31×10⁻² mol), p-toluenesulfonic acid monohydrate 85% (0.324 g., 165×10⁻⁴ mol) and 1,2,4-trichlorobenzene (15 ml.) for 20 hours provided on cooling (15°) an orange solid mixture of starting material and product.

After slurrying three times with acetone, the crude product was dissolved in N-methylpyrrolidone and water was added to reprecipitate the product. A chloroform solution of this partially refined material was placed on a silica gel column and product eluted with a mixture of benzene, chloroform and ethyl acetate (40, 40 and 20%). The dried solid was washed with chlorobenzene and air dried to obtain the desired product as a yellow powder, M.P. 350–2°, crystallization exotherm 320°.

EXAMPLE 7

2-naphthyl-bis-[1 - (3 - phenylcoumarin-7-yl)-3-methylpyrazol-4-yl]methane 2-naphthaldehyde (2.65 g., 1.66×10⁻² mol), 1-(3-phenylcoumarin - 7 - yl) - 3 - methylpyrazole (10.0 g., 3.31×10⁻² mol, p-toluenesulfonic acid monohydrate, 85% (0.324 g., 1.66×10⁻³ mol) and 1,2,4-trichlorobenzene (15 ml.) were refluxed for 18 hours to provide condensation.

After cooling to room temperature, the precipitate was dissolved in chloroform, placed on a silica gel column and eluted with 5% ethyl acetate in chloroform. Evaporation of the solvent provided the desired product as a yellow solid, M.P. 301–3° C.

On comparing polyester products containing optical brightening compounds of the present invention with polyesters containing known commercial brighteners, such as, for example, 7-naphtho[a,d]triazol-2-yl)-3-phenylcoumarin, it was found that the polyester products containing the optical brightening compounds of the present invention were at least as fluorescent but possessed increased retentivity and stability as compared with polyester products containing the aforesaid known brighteners. The superior retentivity was probably due to the solubility of the present brightening compounds in the prepolymer and polymer.

While the present invention has been described in considerable detail with particular reference to certain preferred embodiments thereof, it should be understood that variations and modifications can be effected within the spirit and scope of the invention as described hereinabove and as defined in the appended claims.

What is claimed is:
1. A compound of the formula

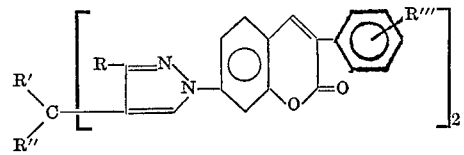

wherein
R is lower alkyl;
R′ is hydrogen or alkyl from 1 to 18 carbon atoms, phenyl, naphthyl, substituted phenyl of the formula
$C_6H_{5-n}X_n$
where $n$ is 1 or 2 and X is lower alkyl,
R″ is hydrogen; and
R‴ is hydrogen or lower alkyl.

2. A compound as claimed in claim 1 which is bis[1-(3-phenylcoumarin-7-yl)-3-methylpyrazol-4-yl]methane.

3. A compound as claimed in claim 1 which is methyl-bis[1-(3-phenylcoumarin-7-yl) - 3 - methylpyrazol - 4 - yl]methane.

4. A compound as claimed in claim 1 which is phenyl-bis[1 - (3 - phenylcoumarin - 7 - yl) - 3 - methylpyrazol-4-yl]methane.

5. A compound as claimed in claim 1 which is 2-naphthyl-bis[1-(3-phenylcoumarin-7-yl)-3 - methylpyrazol - 4-yl]methane.

6. A compound which is 4-biphenyl-bis[1-(3-phenylcoumarin-7-yl)-3-methylpyrazol-4-yl]methane.

References Cited
UNITED STATES PATENTS
3,123,617  3/1964  Hausermann _____ 260—310 C OTHER REFERENCES
Grandberg et al., Chem. Abst. vol. 55, columns 18710–11 (1961).
Grandberg et al., Zhur. Obshchei Khim vol. 30, pp. 3324–8 (1960).
Grandberg et al., Chem. Abst. vol. 57, column 9839 (1962).
Grandberg et al., Zhur. Obshchei Khim vol. 31, pp. 3700–5 (1961).
Grandberg et al., Chem. Abst. vol. 58, column 3412 (1963).
Grandberg et al., Zhur. Obshchei Khim vol. 32, pp. 874–8 (1962).

NATALIE TROUSOF, Primary Examiner

U.S. Cl. X.R.
117—33.5 T; 252—301.2 W